Patented Sept. 9, 1952

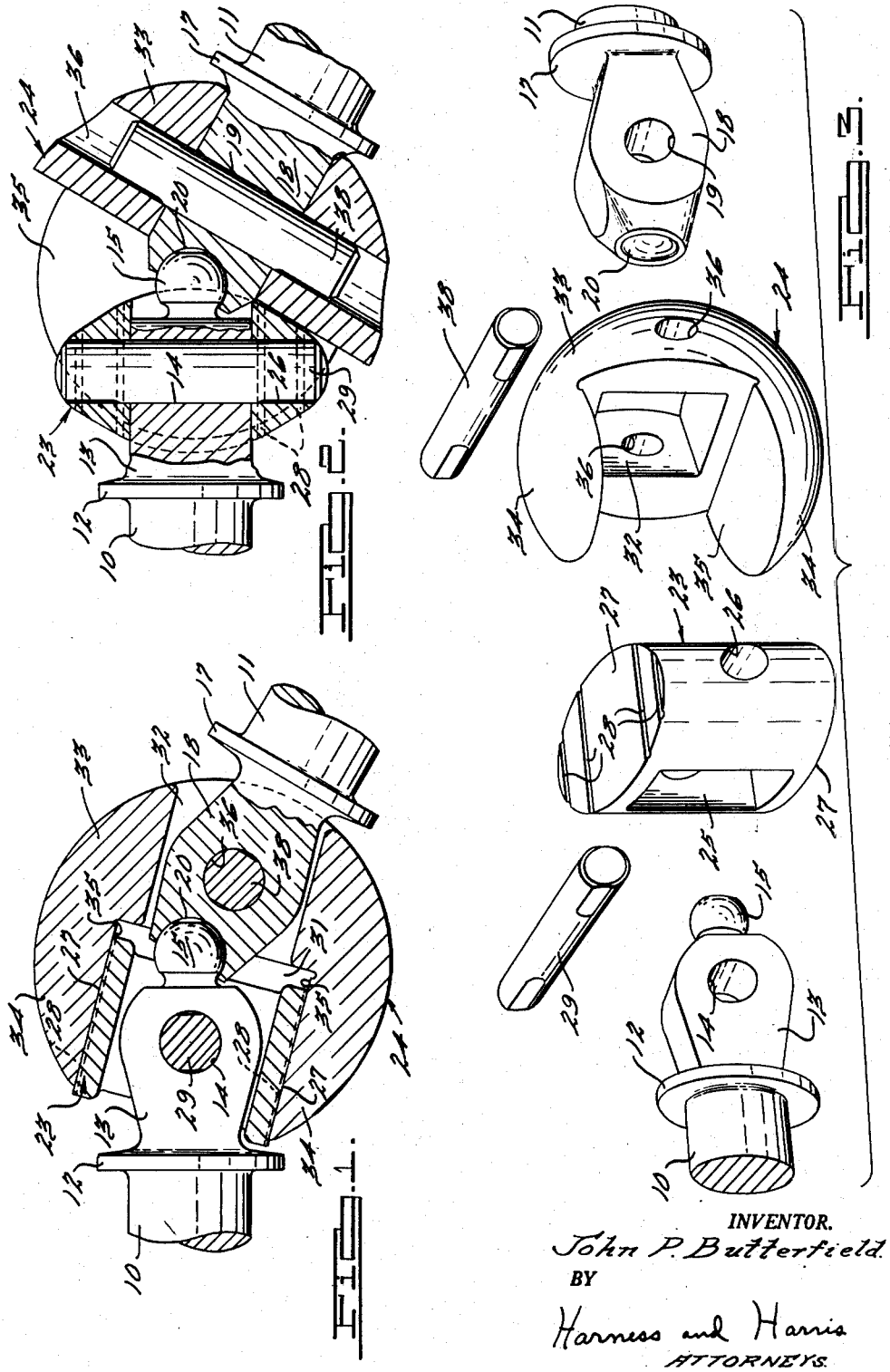

2,609,673

UNITED STATES PATENT OFFICE 2,609,673

UNIVERSAL JOINT

John P. Butterfield, Grosse Pointe Woods, Mich., assignor to Chrysler Corporation, Highland Park, Mich., a corporation of Delaware Application November 27, 1948, Serial No. 62,319

1 Claim. (Cl. 64—21)

This invention relates to universal joints of the type adapted to transmit rotary motion between a driving and driven shaft in such a manner that the rate of angular velocity of the shafts shall be the same for all angular relationships of the shafts.

It is a primary object of this invention to provide a universal joint of an improved and extremely simplified form which will maintain a uniform angular velocity ratio of 1:1 between the driving and driven shafts while efficiently taking and transmitting both thrust and radial loads between the shafts.

It is an additional object of this invention to provide a constant velocity type of universal joint that is self-centering and self-supporting. The self-centering, self-supporting means herein referred to is located internally of the joint and this materially reduces the external bearing requirements and concentrates the thrust and radial loads within the joint between the external bearing members.

It is a further object of this invention to provide a constant velocity universal joint that has constant, relatively low, external bearing requirements which are not subjected to the usual high magnitude, fluctuating loads common to so many of the constant velocity universal joints.

It is another object of this invention to provide a constant velocity universal joint having a ball and socket connection between the adjacent shaft ends which connection provides a thrust center to take and directly transmit thrust between the joint-connected shafts.

It is another object of this invention to provide a constant velocity universal joint that reduces the external bearing requirements to such an extent that a minimum of relatively small, closely spaced, external bearings may be used to achieve a very efficient, compact construction. This point is of particular significance where space limitations are critical. Due to this joint not being subjected to fluctuating external forces or the like, fewer radial shaft bearings are required. Furthermore, as axial thrust is directly taken and transmitted through the ball and socket shaft connection the external thrust bearing requirements are also reduced to a minimum. The reduction in size and number of the required bearings tends to reduce the required bearing space to a minimum and permits a very compact, economical, assembly.

It is a further object of this invention to provide a simplified form of constant velocity universal joint having a thrust transmitting shaft connection that will maintain the shafts in alignment and withstand tension as well as compression forces.

It is another object of this invention to provide a constant velocity universal joint construction in which the loads are directly transmitted through the engaged joint elements and the conventional housing for the joint relieved of the usual loads applied thereto.

It is also an object of this invention to provide a constant velocity universal joint which is simple and durable in construction, easily manufactured at a reasonable cost, easily assembled and disassembled, highly efficient in operation, and one that lends itself to a compact installation due to the reduced external bearing requirements.

Other objects and advantages of this invention will become apparent from a reading of the subsequent description and a consideration of the related drawings wherein:

Fig. 1 is a sectional elevation of my universal joint connecting a pair of shafts disposed at an angle to one another;

Fig. 2 is another sectional elevation of the joint shown in Fig. 1 but taken when the shafts have been rotated 90° from the position shown in Fig. 1; and Fig. 3 is an exploded view of the joint elements shown assembled in Figures 1 and 2.

My universal joint is shown applied to two power transmitting shafts 10 and 11 respectively, one of which may be considered the driving member and the other the driven member. The shaft 10 is provided with an encircling thrust shoulder 12 and a flat-sided, axially extending, terminal portion 13 which is pierced by a transversely extending bore 14. Bore 14 has an axis that is at right angles to and intersects the axis of shaft 10. The flat sides of terminal portion 13 provide bearing surfaces that may be engaged by cooperating surfaces on the associated torque transmitting member 23. Projecting from the exposed end of shaft terminal portion 13 is a substantially spherical or ball-shaped formation 15 that is aligned with the axis of the shaft 10.

Shaft 11 is also provided with an encircling thrust shoulder 17 and a flat-sided, axially extending, terminal portion 18 which is pierced by a transversely extending bore 19 having its axis intersecting and at right angles to the axis of shaft 11. The flat sides of terminal portion 18 provide bearing surfaces that may be engaged by cooperating surfaces on the torque transmitting member 24 associated therewith. Formed in the exposed end of terminal portion 18 and aligned with the axis of shaft 11 is a spherical or ball-shaped recess 20. Recess 20 in the end of shaft 11 is slightly larger in diameter than the spherically-shaped projection 15 carried by shaft 10 so that projection 15 may be seated within the recess 20 when the joint elements are assembled. The connection between the slidably engaged, thrust transmitting, self-centering, shaft-supporting elements 15, 20 may be formed such that socket 20 is fixedly attached to ball 15 so as to provide a joint that will withstand tension as well as compression.

In addition to the cooperating terminal formations on the shafts 10 and 11 this universal joint includes the male and female torque transmitting, coupling elements 23 and 24 respectively. Male coupling element 23 is a block of elliptically-shaped cross-sectional configuration having parallel, flat-sided end faces 27 and a rectangularly-shaped, longitudinally extending, opening 25 piercing the block in the direction of its minor axis. Opening 25 is adapted to receive the flat-sided terminal portion 13 of shaft 10. Coupling element 23 is also pierced by a transversely extending bore 26 which extends in the direction of the major axis of the elliptically-shaped block member 23. Bore 26 is adapted to be aligned with the bore 14 in the terminal portion 13 of shaft 10, when the latter shaft portion is mounted within block opening 25. A pin 29 is mounted in the aligned bores 14 and 26 to pivotally connect the shaft 10 to the coupling member 23 and provide means for the transmission of torque between these connected elements. The flat-sided ends 27 of coupling member 23 are preferably formed with lubricant retaining grooves 28 for a reason that will hereinafter be fully explained.

Female coupling member 24 is substantially a spherically-shaped solid having a U-shaped, transversely extending, cut-out portion 31 extending therethrough in one direction and a rectangularly-shaped, longitudinally extending, opening 32 extending therethrough at right angles to and intersecting the U-shaped opening 31. The U-shaped cut-out portion 31 causes coupling element 24 to resemble a yoke or jaw member and divides the coupling member 24 into a base portion 33 and a pair of spaced apart tongue members 34. Each tongue member 34 has a flat, inner side 35. The opposed inner flat sides 35 of tongues 34 are parallel and spaced apart a distance slightly greater than the distance between the ends 27 of male coupling member 23 which latter member is adapted to be slidably mounted within the cut-out portion 31 of member 24. The rectangular opening 32 in the base portion 33 of coupling member 24 is adapted to receive the terminal portion 18 of shaft 11. Base portion 33 of member 24 is pierced by a transversely extending bore 36 which is adapted to be aligned with the bore 19 in the terminal portion 18 of shaft 11 when the latter shaft portion is mounted in opening 32. A pin 38 is mounted in aligned bores 19 and 36 to pivotally connect the shaft 11 to the coupling member 24 and provide for the transmission of torque.

In the arrangement shown it will be noted that the axes of the pins 29 and 38 are equally spaced from the point of intersection of the shaft axes. Also it will be noted that the coupling members 23 and 24 are pivotally connected to their supporting shaft members 10 and 11 on pivot axes extending at right angles to and intersecting the axis of the supporting shafts. Furthermore, the coupling members 23, 24 are each provided with oppositely disposed parallel, bearing surfaces 27 and 35 respectively which slidably engage the mating parallel bearing surfaces on the other coupling member, and these surfaces are slidable relative to one another in any direction parallel to the surfaces 27 and 35. In addition the pivot axes for the coupling members are always in a plane parallel with the planes of the mating bearing surfaces. Also it will be noted that the ball and socket connection 15, 20 between the shafts maintains the shafts aligned to assure constant velocity torque transmission.

With the shafts 10 and 11 pivotally connected to their respective coupling members 23 and 24 and the ball 15 on shaft 10 mounted in its mating socket 20 in the end of shaft 11 a constant velocity universal joint is provided which directly transmits thrust and radial loads between the connected shafts. During rotation of the shafts 10 and 11 the coupling members 23 and 24 rock about their respective pivot pin connections 29 and 38 and in so doing the end faces 27 of male coupling member 23 slide across the mating inner side faces 35 of the tongues 34 of female coupling member 24. The lubricant retaining grooves 28 in the end faces 27 of male coupling member 23 tend to keep the contacting coupling faces 27 and 35 lubricated at all times so that frictional resistance is reduced to a minimum. Due to the ball and socket connection 15, 20 which directly takes and transmits thrust between the shafts the external thrust bearing requirements are kept at a minimum. Also, due to the ball and socket connection 15, 20 maintaining the shafts aligned and providing means for taking and transmitting radial loads between the shafts, fluctuating loads are not applied to the coupling members 23, 24 and as a result the external bearing loads are constant and relatively low. In addition to the above advantages the simplicity and reduced number of elements required for this joint make it commercially important. The exploded view of the joint, Fig. 3, clearly shows that this joint is composed of nothing more than the shaft end ball and socket formations, a pair of mating coupling members each of which is formed by simple cuts through a solid block, and a pair of pivot pins. Each of these elements may be easily and economically manufactured and assembled and the novel joint arrangement is such as to keep wear of the joint components to a minimum and render the joint extremely durable. In testing this joint it has been found that the clearance between the end faces 27 of block 23 and the inner sides 35 of jaw tongues 34 may be kept to a minimum for during the transmission of torque the jaw tongues 35 are spread sufficiently to distribute the bearing pressures over a relatively large area of the block end faces 27 and this prevents corner loading of the block 23 and eliminates the need for modifying the contacting surfaces of the block 23 and jaw tongues 34 to specifically accomplish this function.

I claim:

A constant velocity, force transmitting, universal joint composed of a pair of shafts each having adjacent terminal portions flattened along opposite sides that extend parallel to the associated shaft axis, one of said shaft terminal portions having an axially extending, ball-shaped formation projecting from the end thereof and the other of said shaft terminal portions having an axially extending, ball-shaped recess formed in the end thereof matingly receiving the ball-shaped formation on the terminal portion of said first mentioned shaft to provide means for the direct transmission of radial loads between said shaft terminal portions, a first coupling member comprising a block element having a pair of spaced, parallel, longitudinally extending flat ends and a longitudinally extending, opening therethrough extending between said flat ends adapted to receive the terminal portion of one of said shafts, pivot pin means pivotally connecting said first coupling member to the terminal portion of the shaft member mounted in the opening in the block arranged to provide for rotation of the block about an axis normal to the associated shaft axis, a second coupling member comprising a jaw element having a first transversely extending opening therethrough forming a pair of spaced tongues with flat, parallel, longitudinally extending inner sides slidably receiving therebetween the flat ends of said first coupling member in surface to surface engagement, a second longitudinally extending, substantially flat-sided opening through said second coupling member arranged between said tongues and intersecting the first opening through said second coupling member, said second opening in said second coupling member receiving the terminal portion of the other of said shaft members, and pivot pin means pivotally connecting said last-mentioned other shaft member to said second coupling member for rotation about an axis normal to the associated shaft axis, said pivot pins each having an axis at right angles to and intersecting the axis of the shaft to which it is connected and each pin axis spaced equally distant from the point of intersection of the shaft axes, said ball and socket load transmitting connection between the adjacently positioned shaft terminal portions being continuously located interiorly of the slidably engaged coupling members between the slidably engaged surfaces of said block and jaw elements.

JOHN P. BUTTERFIELD.

REFERENCES CITED

The following references are of record in the file of this patent:

UNITED STATES PATENTS

| Number | Name | Date |
|---|---|---|
| 1,898,265 | Ragan | Feb. 21, 1933 |
| 2,426,701 | Miller, Jr. | Sept. 2, 1947 |
| 2,473,036 | Miller, Jr. | June 14, 1949 |

FOREIGN PATENTS

| Number | Country | Date |
|---|---|---|
| 705,038 | France | 1931 |